(12) United States Patent
Lee et al.

(10) Patent No.: US 10,164,305 B2
(45) Date of Patent: Dec. 25, 2018

(54) ENERGY STORAGE APPARATUS AND METHOD FOR COOLING THE ENERGY STORAGE APPARATUS

(71) Applicant: LG Chem, Ltd., Seoul (KR)

(72) Inventors: Hyun-Min Lee, Daejeon (KR); Ji-Won Lee, Daejeon (KR); Suk-Chul Kim, Daejeon (KR); Tae-Shin Cho, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/494,707

(22) Filed: Apr. 24, 2017

(65) Prior Publication Data

US 2017/0309979 A1 Oct. 26, 2017

(30) Foreign Application Priority Data

Apr. 25, 2016 (KR) .................. 10-2016-0050180

(51) Int. Cl.
*H01M 10/00* (2006.01)
*H01M 10/6563* (2014.01)
(Continued)

(52) U.S. Cl.
CPC ..... *H01M 10/6563* (2015.04); *H01M 2/1077* (2013.01); *H01M 10/613* (2015.04);
(Continued)

(58) Field of Classification Search
CPC ........... H01M 10/6563; H01M 10/627; H01M 2220/10; H01M 10/6566; H01M 10/647; H01M 10/6556; H01M 10/613
See application file for complete search history.

(56) References Cited

U.S. PATENT DOCUMENTS

2011/0183179 A1 7/2011 Okada
2013/0017428 A1* 1/2013 Han ................... H01M 2/1077
429/99
(Continued)

FOREIGN PATENT DOCUMENTS

EP 2141974 A2 1/2010
EP 2362721 A1 8/2011
(Continued)

OTHER PUBLICATIONS

Extended European Search Report for Application No. EP17167745.3 dated Jul. 13, 2017.

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

An energy storage apparatus includes a chamber including a receiving space therein, battery racks including first and second battery rack groups positioned in the receiving space and spaced apart from each other while facing each other with reference to a center of the receiving space, an upper duct positioned above the receiving space configured to supply cooling fluid to a cooling space which is a space between the first battery rack group and the second battery rack group, a cooling unit positioned outside the receiving space and configured to cool the cooling fluid, and a fluid moving member comprising a moving space where the cooling fluid heated after cooling the battery racks moves to the cooling unit, in which the cooling unit is supplied with the heated cooling fluid from the moving space, cools the supplied cooling fluid, and then supplies a resultant fluid to the upper duct.

20 Claims, 14 Drawing Sheets

(51) Int. Cl.
*H01M 10/627* (2014.01)
*H01M 10/613* (2014.01)
*H01M 2/10* (2006.01)
*H01M 10/6556* (2014.01)
*H01M 10/6557* (2014.01)
*H01M 10/617* (2014.01)
*H01M 10/6566* (2014.01)
*H01M 10/647* (2014.01)

(52) U.S. Cl.
CPC ....... *H01M 10/617* (2015.04); *H01M 10/627* (2015.04); *H01M 10/6556* (2015.04); *H01M 10/6557* (2015.04); *H01M 10/6566* (2015.04); *H01M 10/647* (2015.04); *H01M 2220/10* (2013.01)

(56) References Cited

U.S. PATENT DOCUMENTS

2014/0069113 A1　　3/2014　Oh et al.
2016/0218333 A1*　7/2016　Takasaki ................ H01M 2/12

FOREIGN PATENT DOCUMENTS

| EP | 2400580 | A1 | 12/2011 |
| EP | 2991134 | A1 | 3/2016 |
| KR | 101459832 | B1 | 11/2014 |
| WO | 2007047809 | A2 | 4/2007 |

* cited by examiner

ENERGY STORAGE APPARATUS AND METHOD FOR COOLING THE ENERGY STORAGE APPARATUS

CROSS REFERENCE TO RELATED APPLICATIONS

The present application claims priority from Korean Patent Application No. 10-2016-0050180 filed on Apr. 25, 2016, the disclosure of which is hereby incorporated herein by reference.

TECHNICAL FIELD

The present disclosure relates to an energy storage apparatus including a battery rack provided with a plurality of secondary batteries and a method for cooling the energy storage apparatus.

BACKGROUND ART

Generally, smart grid is considered to be the future energy network that optimizes efficiency of operating the energy network through a bidirectional communication between supplier and consumer, while observing and controlling the energy network in real time using a combination of a related energy system and the information and communication technologies. Smart grid can be operated in association with new energy devices such as renewable energy generation system, electric vehicle charging system, and so on, which are recently increased, and since the energy consumption information of consumer is provided in real time, efficiency of using energy can be increased. Accordingly, the effect is provided, in which unnecessary investment for energy generation equipment can be saved, and emission of the greenhouse gases can be reduced. Recently, smart grid has been receiving increasing attention due to issues such as plans to modernize the energy network and expansion of the renewable energy, and the researches thereof are actively conducted.

The energy storage apparatus is one of the core technologies related with smart grids. The energy storage apparatus is aimed at balancing the loads, by storing the energy at off-peak time and using the stored energy at peak time. This energy storage apparatus can support efficient utilization of energy equipment.

Related technology mainly uses a pumped energy generation that converts surplus energy at night into potential energy of the water, or a chemical energy storage that combines a plurality of lead-acid batteries in series or in parallel.

However, since the pumped generation requires a sufficient amount of water, and also has strict conditions for the location thereof, it takes considerable cost for the construction thereof. Further, the lead-acid battery has a problem of low energy storage density, which restricts it from being configured for a high-voltage, high-capacity use.

Meanwhile, development of a lithium ion battery having a high energy storage density has recently enabled the establishment of the high-voltage, high-capacity energy storage apparatus with the chemical energy storage method.

The energy storage apparatus using the chemical energy storage method includes a battery module comprised of the lithium ion battery having high energy density, and a certain number of such battery modules are stacked in electrical connection in a battery rack formed in multi-stages.

Because such battery rack keeps therein battery modules, it is necessary that certain temperature and humidity are kept, good ventilation is ensured, and access to the stacked battery module for maintenance and repair is easy.

FIG. 1 is a perspective view schematically illustrating a related energy storage apparatus, and FIG. 2 is a cross-sectioned view of the energy storage apparatus of FIG. 1. Referring to FIGS. 1 and 2, the energy storage apparatus 1 includes a container 2, a battery rack 3, and a cooling member 4.

A plurality of battery racks 3 are positioned within the container 2. A plurality of battery racks 3 are adjacent to one sidewall and the other sidewall of the container 2, and disposed in parallel along a length direction of the sidewalls. Further, the cooling member 4 for cooling the heat generated from the battery racks 3 may be positioned within the container. The cooling member 4 may be necessarily provided for the maintenance and repair of the battery module.

However, the related energy storage apparatus 1 has following problems. When there is more number of the battery racks 3 positioned within the container 2, the energy density of the energy storage apparatus 1 may be further enhanced. However, since the cooling member 4 is positioned within the container 2, the number of the battery racks 3 provided within the container 2 is limited. Further, the limited number of the battery racks 3 may deteriorate energy density of the energy storage apparatus 1.

During cooling of the battery racks 3, heat may be generated in a process of cooling the cooling fluid having been used to cool the battery racks 3 with the internal cooling member 4. This heat serves as a cause of increased temperature inside the container 2. Accordingly, cooling efficiency of the battery racks 3 is deteriorated, and the cooling member 4 has to have an increased capacity, thus causing a problem that an area occupied by the cooling member 4 within the container 2 is increased.

DISCLOSURE

Technical Problem

The present disclosure is designed to solve the problems of the related art, and therefore the present disclosure is directed to providing an energy storage apparatus having high energy density.

Further, the present disclosure is directed to providing an energy storage apparatus that can enhance cooling efficiency of a battery rack and a method for cooling the energy storage apparatus.

The present disclosure is not limited herein, and the above and other objects and advantages of the present disclosure may be understood from the following detailed description and will become more fully apparent from the exemplary embodiment of the present disclosure.

Technical Solution

In one aspect of the present disclosure, there is provided an energy storage apparatus.

According to an exemplary embodiment of the present disclosure, an energy storage apparatus may include a chamber including a receiving space therein, battery racks comprising a first battery rack group and a second battery rack group positioned in the receiving space and spaced apart from each other while facing each other with reference to a center of the receiving space, an upper duct positioned above the receiving space configured to supply cooling fluid to a cooling space which is a space between the first battery rack group and the second battery rack group, a cooling unit positioned outside the receiving space and configured to cool the cooling fluid, and a fluid moving member comprising a moving space where the cooling fluid heated after cooling the battery racks moves to the cooling unit. The cooling unit may be configured to be supplied with the heated cooling fluid from the moving space, cool the supplied cooling fluid, and then supply a resultant fluid to the upper duct.

According to an exemplary embodiment, the chamber may include a first sidewall, a second sidewall positioned perpendicularly to the first sidewall, a third sidewall facing the first sidewall and positioned perpendicularly to the second sidewall, and a fourth sidewall facing the second sidewall and positioned perpendicularly to the first sidewall and the third sidewall. A plurality of cooling units may be provided on an outer side of the first sidewall and the third sidewall.

According to an exemplary embodiment, the battery rack may include a rack housing comprising a space therein, a plurality of battery modules positioned in the inner space of the rack housing, and a cooling fan coupled with the battery module.

According to an exemplary embodiment, the rack housing may include a front cover comprising a plurality of holes, and a rear plate having a coupling hole to be inserted with a portion of the battery module.

According to an exemplary embodiment, a plurality of battery modules may be stacked on one another and positioned within the rack housing, and the cooling fan may be positioned on an outer side of the rear plate.

According to an exemplary embodiment, the battery racks of the first battery rack group may be spaced apart from the second sidewall by a certain distance and disposed in parallel along a first direction, the battery racks of the second battery rack group may be spaced apart from the fourth sidewall by a certain distance and disposed in parallel along the first direction, and the cooling fans of each group may be positioned adjacently to the second sidewall or the fourth sidewall.

According to an exemplary embodiment, the fluid moving member may include a partition positioned above the first battery rack group and the second battery rack group, a pair of blocking plates configured to block a space between the battery rack positioned on an outermost side of the first battery rack group or the second battery rack group and the second sidewall or the fourth sidewall, and a pair of inner ducts configured to connect a moving space between the cooling unit and the second sidewall or a moving space between the second sidewall and the first battery rack group or the second battery rack group.

According to an exemplary embodiment, the chamber may be provided with a door formed on the second sidewall or the fourth sidewall and positioned adjacently to the first sidewall or the third sidewall, and the inner duct may be positioned to be higher than an upper surface of the door.

According to an exemplary embodiment, the upper duct may include a first horizontal part positioned adjacently to the first sidewall, a second horizontal part positioned adjacently to the third sidewall and in parallel to the first horizontal part, and a center part coupled perpendicularly to centers of the first horizontal part and the second horizontal part, respectively.

According to an exemplary embodiment, the first horizontal part, the second horizontal part, and the center part may be combined with each other to be formed into an I-shape when seen from above.

According to an exemplary embodiment, the upper duct may include a supply which is configured to supply the cooling fluid to the receiving space and positioned on the center part. The supply may include an opening where the cooling fluid flowing inside the upper duct is passed through, a plurality of guide plates disposed on a center region of the opening in parallel while being spaced apart from each other along the first direction, the guide plate being rotatably provided, and a controller configured to control the guide plate.

According to an exemplary embodiment, a plurality of supplies may be positioned on a lower surface of the center part, and the plurality of supplies may be spaced apart by a certain distance along the first direction.

According to an exemplary embodiment, the controller may control the guide plate so as to adjust a supply direction of the cooling fluid supplied to the cooling space through the opening.

According to an exemplary embodiment, the fluid moving member may include a partition positioned above the first battery rack group or above the second battery rack group, and an outer duct positioned outside the second sidewall or the fourth sidewall, having therein the moving space where the cooling fluid flows, and configured to supply the cooling fluid to the cooling unit.

According to an exemplary embodiment, the second sidewall and the fourth sidewall may be provided with a plurality of outlets where the cooling fluid is discharged to the moving space.

In another aspect of the present disclosure, there is provided a method for cooling an energy storage apparatus including a plurality of battery racks therein.

According to an exemplary embodiment, a method for cooling an energy storage apparatus including a plurality of battery racks therein is provided, in which the method may include cooling battery racks, wherein the battery racks comprise a first battery rack group and a second battery rack group positioned in a receiving space and spaced apart from each other while facing each other with reference to a center of the receiving space. The battery racks may be cooled when the cooling fluid is supplied to a cooling space between the first battery rack group and the second battery rack group from above the receiving space and passed through the first battery rack group or the second battery rack group, respectively. The cooling fluid past through the battery racks may be moved through a moving space and cooled by a cooling unit positioned outside the receiving space. The cooling fluid may be supplied to above the receiving space, and then supplied into the cooling space to cool the battery racks.

According to an exemplary embodiment, the cooling space and the moving space may be respectively positioned within the receiving space.

According to an exemplary embodiment, the cooling space may be positioned at a center of the receiving space, and the moving space may be positioned on both edge regions of the cooling space.

According to an exemplary embodiment, the cooling space may be positioned within the receiving space, and the moving space may be positioned outside the receiving space.

According to an exemplary embodiment, each battery rack may include a cooling fan configured to move the cooling fluid from the cooling space to the moving space.

Advantageous Effects

The present disclosure gives the following effects. According to an exemplary embodiment, energy density of the energy storage apparatus can be enhanced by providing a cooling unit outside a space for receiving a battery rack of an energy storage apparatus to thus maximize and a number of the battery racks positioned within a chamber.

Further, according to an exemplary embodiment, a space where the battery rack is cooled is isolated from a space where heated cooling fluid is moved, which may thus enhance cooling efficiency of the battery rack.

Further, according to an exemplary embodiment, cooling efficiency of the battery rack may be enhanced by circulating the cooling fluid using an upper duct and a cooling unit positioned outside a space for receiving the battery rack.

However, effects of the present disclosure are not limited to the described above, and effects not specified herein can be clearly understood from a person skilled in the art in view of the specification and attached drawings.

DESCRIPTION OF DRAWINGS

The accompanying drawings illustrate preferred embodiments of the present disclosure and, together with the foregoing disclosure, serve to provide further understanding of the technical features of the present disclosure. However, the present disclosure is not to be construed as being limited to the drawings.

BEST MODE

Hereinafter, preferred embodiments of the present disclosure will be described in detail with reference to the accompanying drawings. Embodiments according to the present disclosure can be modified in various forms, and the scope of the present disclosure is not to be construed as being limited to the exemplary embodiments described below. Exemplary embodiments according to the present disclosure are provided in order to give more complete description of the present disclosure to those having average knowledge in the art. Accordingly, shapes of elements in drawings may be illustrated to be exaggerated to emphasize more clarity in the description. Further, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Figure 1:
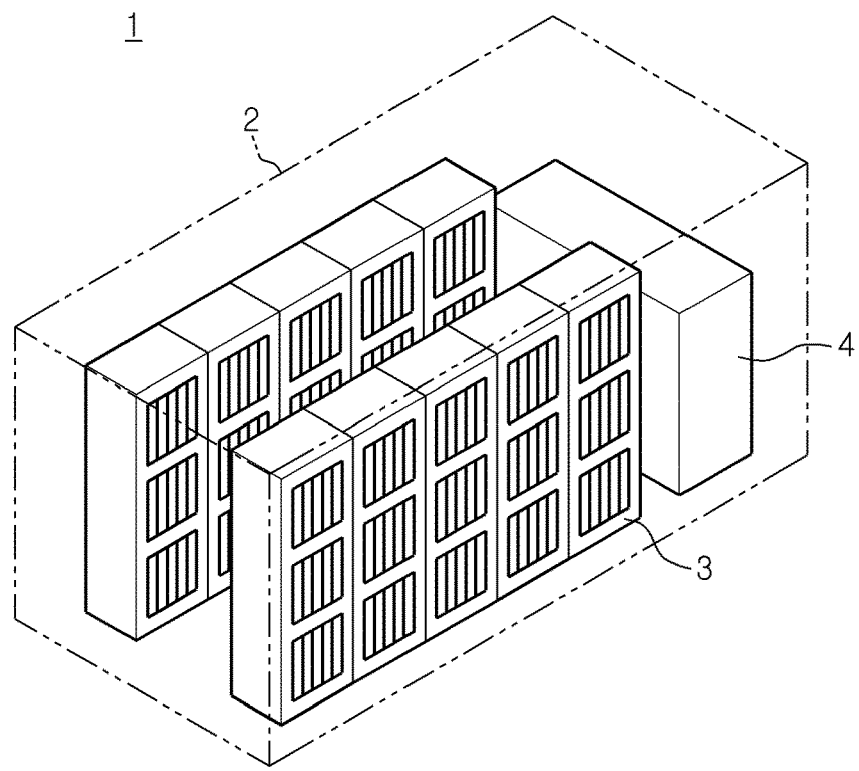
FIG. 1 is a perspective view schematically illustrating a related energy storage apparatus.
Figure 2:
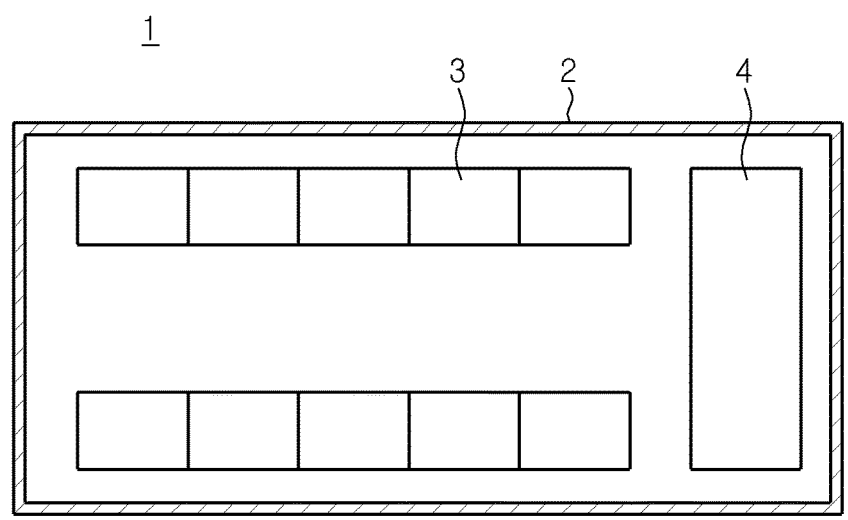
FIG. 2 is a cross-sectioned view of the energy storage apparatus of FIG. 1.
Figure 3:
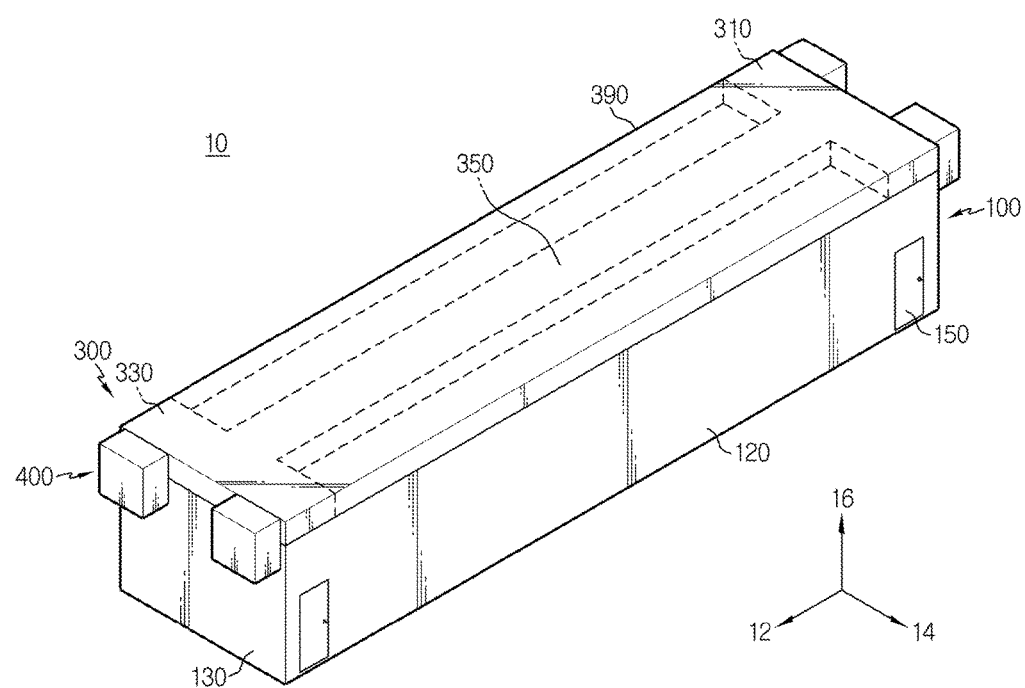
FIG. 3 is a perspective view illustrating an energy storage apparatus according to an exemplary embodiment.
Figure 4:
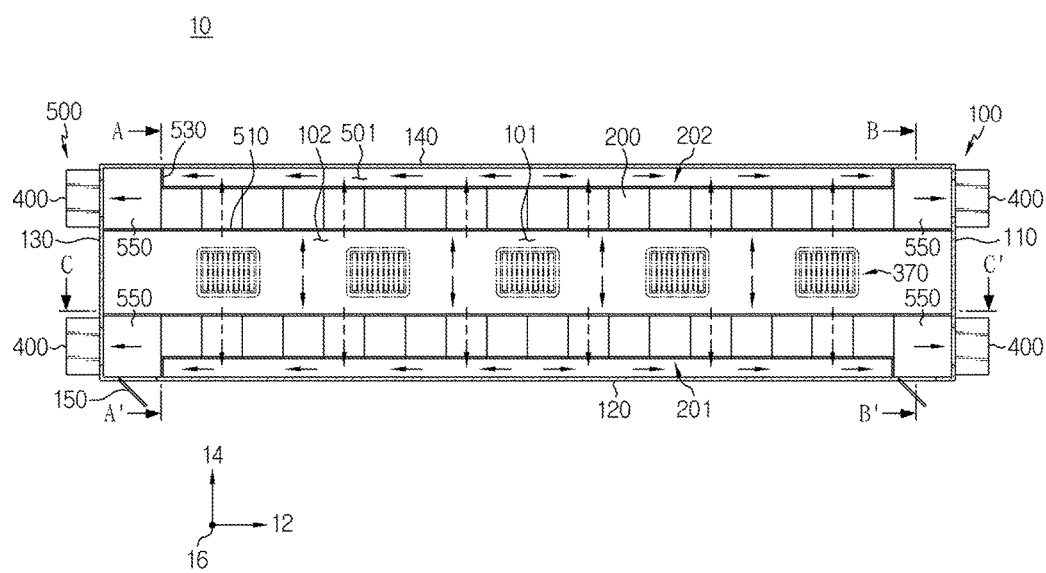
FIG. 4 is a plane cross-sectioned view illustrating the energy storage apparatus of FIG. 3.

FIG. 3 is a perspective view illustrating an energy storage apparatus according to an exemplary embodiment, and FIG. 4 is a plane cross-sectioned view illustrating the energy storage apparatus of FIG. 3. Referring to FIGS. 3 and 4, the energy storage apparatus 10 includes a battery rack 200 including a plurality of battery modules 230 therein. The energy storage apparatus 10 includes a chamber 100, a battery rack 200, an upper duct 300, a cooling unit 400, and a fluid moving member 500.

The chamber 100 includes therein a receiving space 101. In the receiving space 101, a plurality of battery racks 200 and the fluid moving member 500, which will be described below, are positioned. The chamber 100 has an approximately prismatic shape. The chamber 100 includes a first sidewall 110, a second sidewall 120, a third sidewall 130, and a fourth sidewall 140.

In an example, a length direction of the second sidewall 120 is referred to as a first direction 12. When seen from above, a direction perpendicular to the first direction 12 is referred to as a second direction 14. A direction perpendicular to both the first direction 12 and the second direction 14 is referred to as a third direction 16.

The first sidewall 110 and the third sidewall 130 may be spaced apart from each other by a certain distance along the first direction 12. The second sidewall 120 and the fourth sidewall 140 may be spaced apart from each other by a certain distance along the second direction 14.

The second sidewall 120 may be positioned perpendicularly to the first sidewall 110. The second sidewall 120 may be provided in a greater length than the first sidewall 110. The third sidewall 130 and the first sidewall 110 may face each other and be positioned in parallel. The third sidewall 130 may be positioned perpendicularly to the second sidewall 120. The fourth sidewall 140 and the second sidewall 120 may face each other and be positioned in parallel. The fourth sidewall 140 may be positioned perpendicularly to the first sidewall 110 and the third sidewall 130, respectively.

The second sidewall 120 may have a door 150 formed thereon. A plurality of doors 150 may be provided. For example, two doors 150 may be provided. One of the two doors 150 may be positioned adjacently to the first sidewall 110, and the other may be positioned adjacently to the third sidewall 130. On an inner side of the second sidewall 120 facing a space between the two doors 150, the battery racks 200 may be disposed in parallel along the first direction 12.

Although it is exemplified herein that the door 150 is formed on the second sidewall 120, it may not be limited hereto. Accordingly, a plurality of doors 150 may be formed on the fourth sidewall 140. Optionally, the doors 150 may be formed on both of the second sidewall 120 and the fourth sidewall 140.

The battery rack 200 may be positioned in the receiving space 101. A plurality of battery racks 200 may be provided. The battery racks 200 include a first battery rack group 201 and a second battery rack group 202.

The first battery rack group 201 and the second battery rack group 202 may be positioned to face each other with reference to a center of the receiving space 101. The first battery rack group 201 and the second battery rack group 202 may be spaced apart from each other along the second direction 14. The first battery rack group 201 may be spaced apart from the second sidewall 120 by a certain distance. The battery racks 200 of the first battery rack group 201 may be disposed in parallel along the first direction 12.

The second battery rack group 202 may be spaced apart from the fourth sidewall 140 by a certain distance. The battery racks 200 of the second battery rack group 202 may be positioned in parallel along the first direction 12.

Although it is exemplified herein that there are 18 battery racks provided respectively in the first battery rack group 201 and the second battery rack group 202, the number of the battery racks 200 may not be limited hereto.

The first battery rack group 201 and the second battery rack group 202 may be positioned in the cooling space 102 of the receiving space 101.

In an example, the cooling space 102 is defined to be a space including a certain space of the receiving space 101, where the first battery rack group 201 and the second battery rack group 202 are placed. A moving space 501 is defined to be a space that includes a space between the first battery rack group 201 and the second sidewall 120, a space between the second battery rack group 202 and the fourth sidewall 140, and a space between the fluid moving member 500 and an inner duct 550, which will be described below. That is, the moving space 501 is defined to be a space where the fluid moving member 500 to be descried below is provided.

Figure 8:
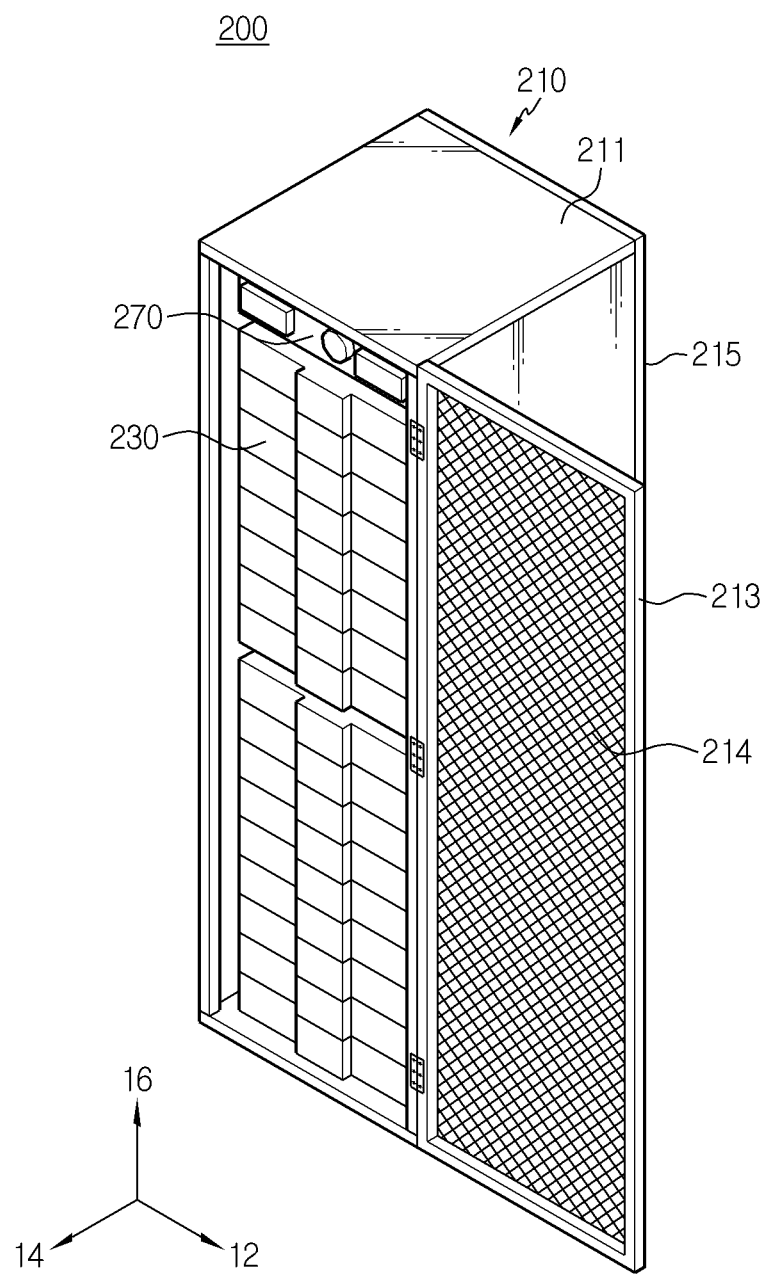
FIG. 8 is a front perspective view illustrating the battery rack of FIG. 3.
Figure 9:
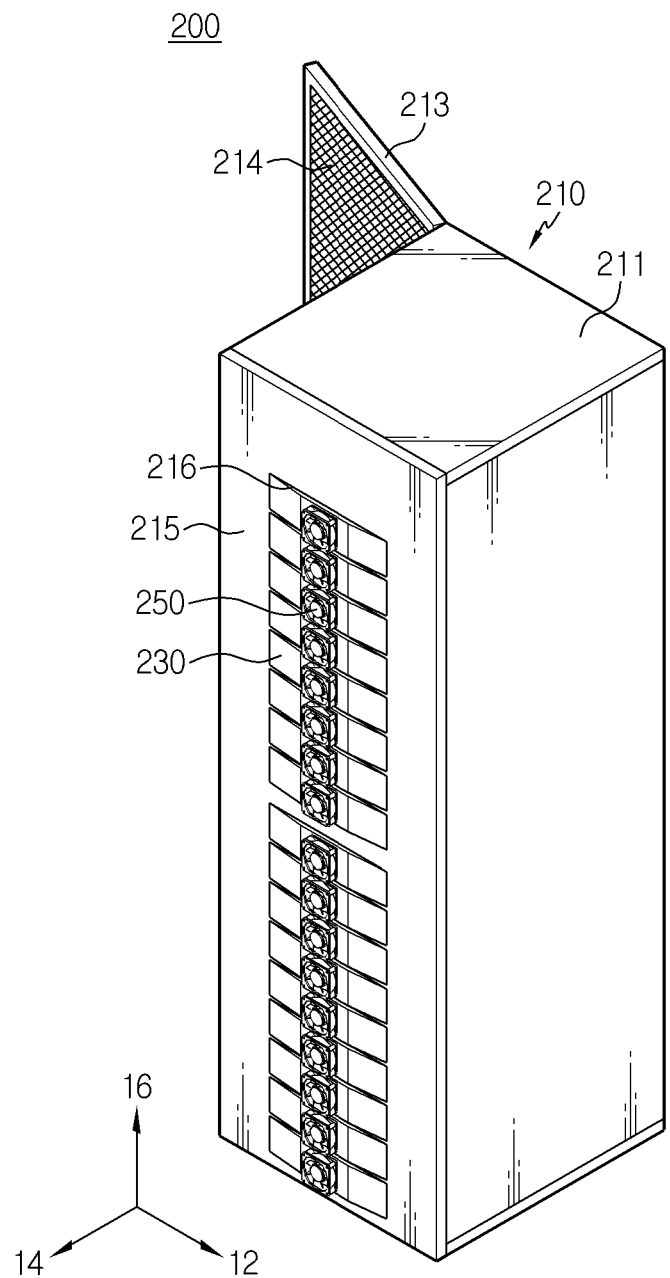
FIG. 9 is a rear perspective view illustrating the battery rack of FIG. 3.
Figure 10:
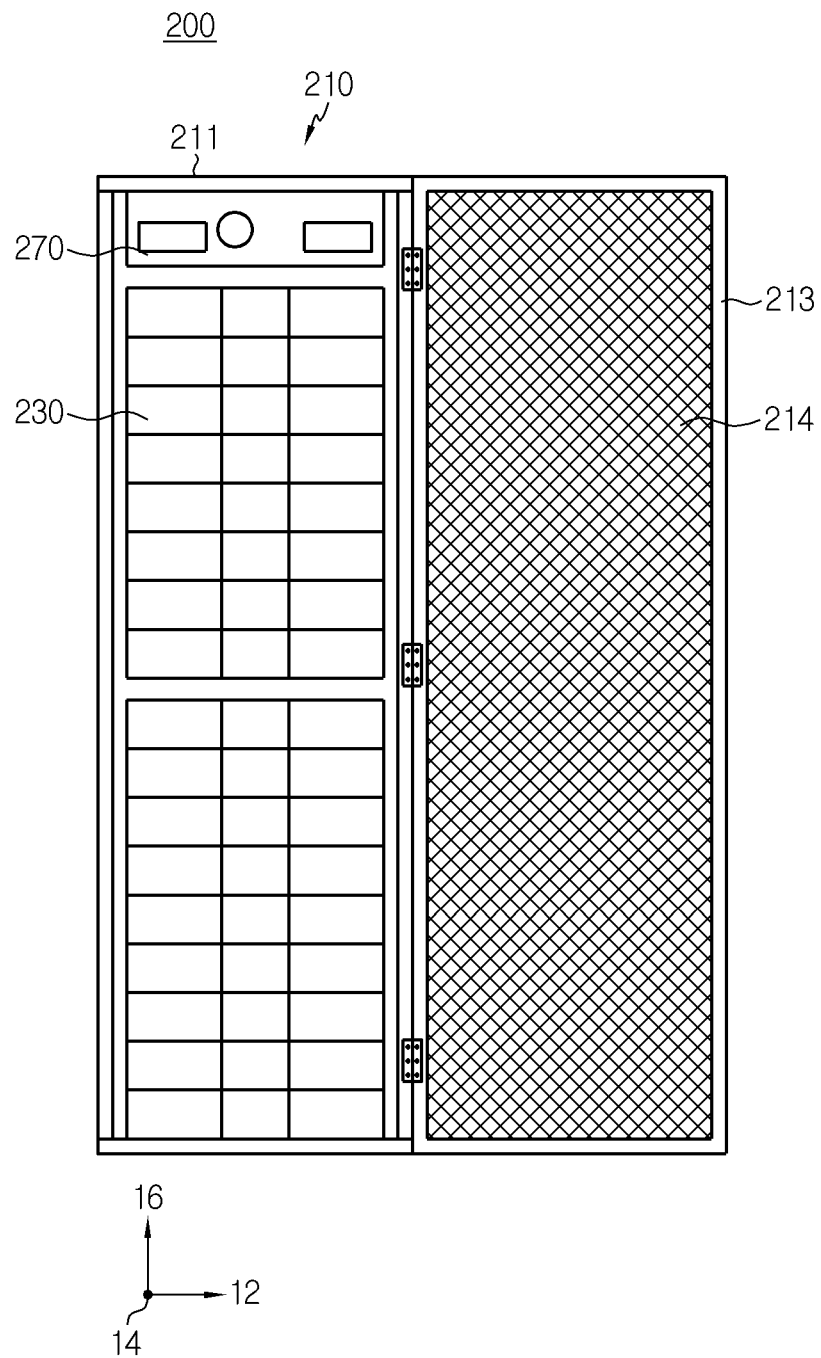
FIG. 10 is a front view of the battery rack of FIG. 8.
Figure 11:
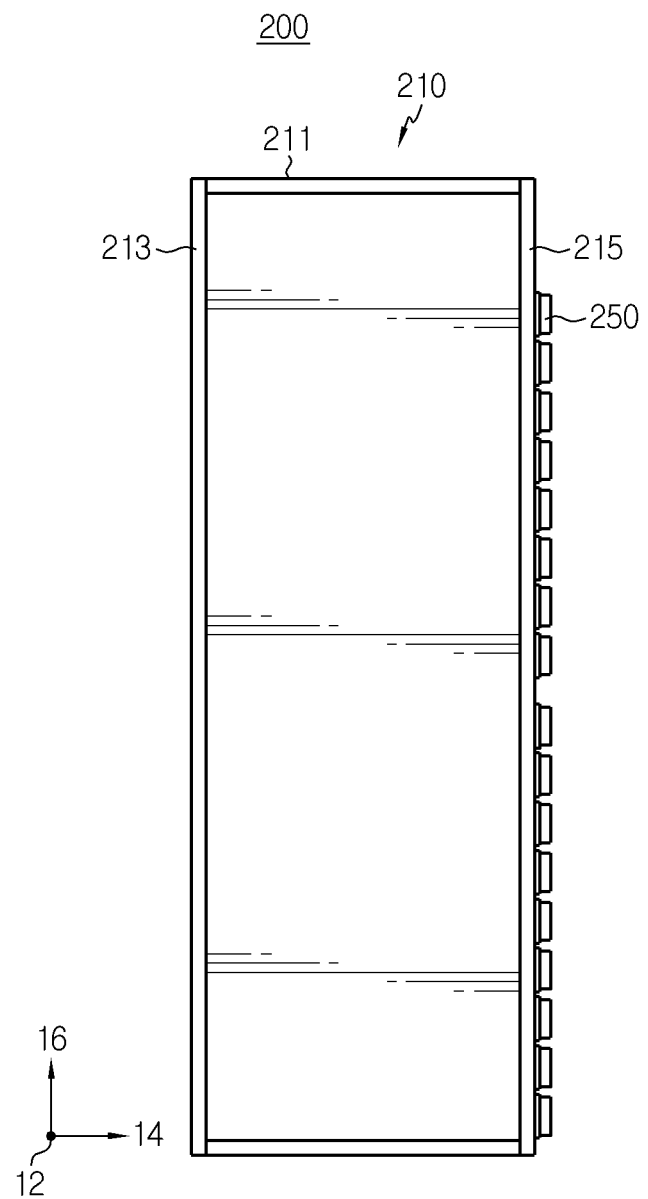
FIG. 11 is a side view of the battery rack of FIG. 8.
Figure 12:
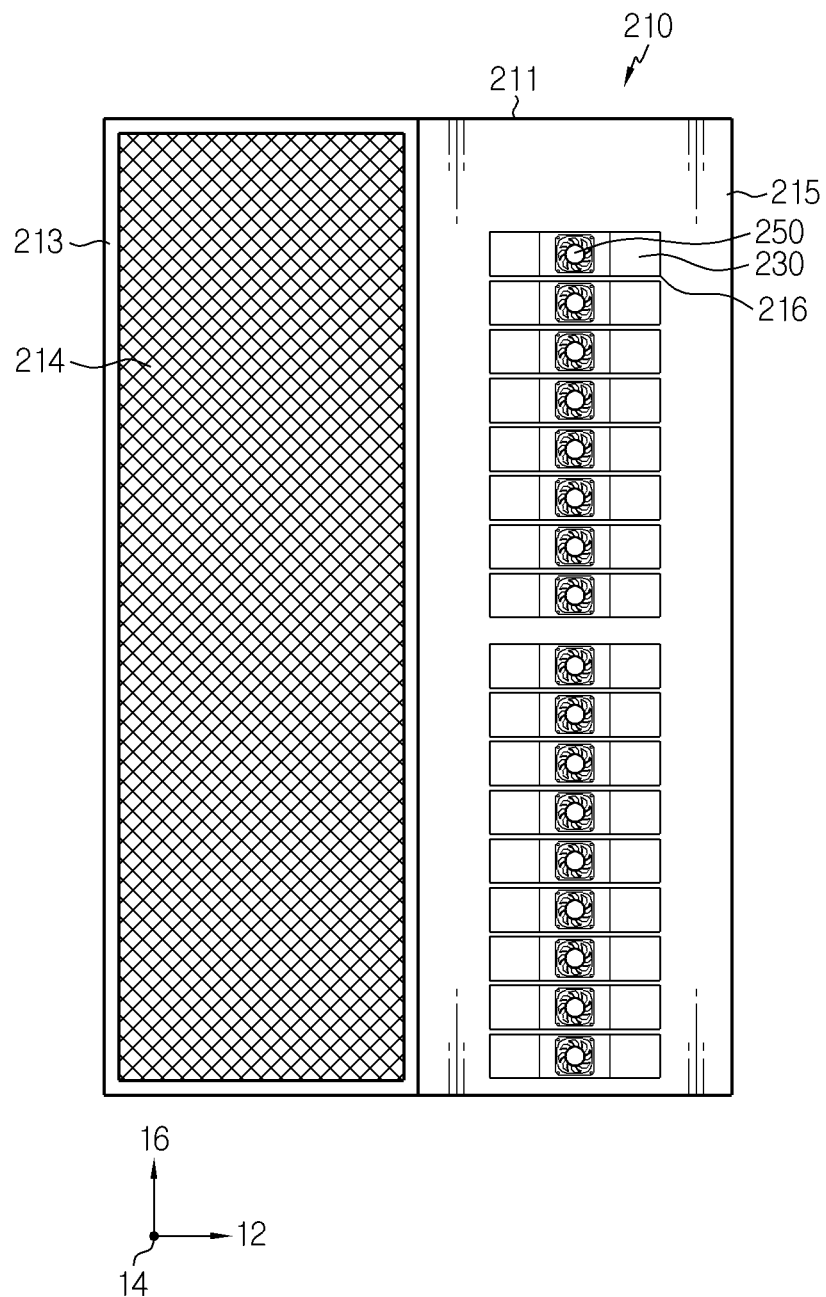
FIG. 12 is a rear view of the battery rack of FIG. 8.

FIGS. 8 to 12 are views illustrating a battery rack according to an exemplary embodiment. Specifically, FIG. 8 is a front perspective view illustrating the battery rack of FIG. 3, FIG. 9 is a rear perspective view illustrating the battery rack of FIG. 3, FIG. 10 is a front view of the battery rack of FIG. 8, FIG. 11 is a side view of the battery rack of FIG. 8, and FIG. 12 is a rear view of the battery rack of FIG. 8. In an example, the front perspective view or the front view is a view illustrating the battery rack 200 in a direction that a front cover 213 of the battery rack 200 is shown. The rear perspective view or the rear view is a view illustrating the battery rack 200 in a direction that a rear plate 215 of the battery rack 200 is shown. Hereinbelow, referring to FIGS. 8 to 12, the battery rack 200 includes a plurality of battery modules 230. The battery module 230 may include a plurality of secondary batteries. The battery rack 200 includes a rack housing 210, the battery module 230, a cooling fan 250, and a controller 270.

The rack housing 210 has a space for receiving a plurality of battery modules 230 therein. The rack housing 210 may have an approximately prismatic shape. The rack housing 210 includes a rack frame 211, the front cover 213, and the rear plate 215.

The rack frame 211 receives the battery module 230 therein. The front cover 213 may be coupled with a front of the rack frame 211 in the second direction 14. The front cover 213 may be fixedly coupled with an end of the rack frame 211 to open and close a front surface of the rack frame 211 in the second direction 14.

The front cover 213 may have an approximately rectangular shape. The front cover 213 has a plurality of holes. In one example, the front cover 213 may have a net in a mesh form on a frame having an opening therein. The net has a plurality of holes 214. Cooling fluid to be described below may pass through the battery module 230 through the holes 214 of the front cover 213.

The rear plate 215 is positioned on a rear surface of the rack frame 211 in the second direction 14. The rear plate 215 may block a rear space of the rack frame 211 excluding a coupling hole 216 (to be described below), to thus seal an inner space of the rack housing 210. The rear plate 215 may block a rear surface of the rack frame 210 such that the cooling fluid past through the front cover 213 may be moved to the moving space through the coupling hole 216. The rear plate 215 is coupled with the rack frame 211. A plurality of coupling holes 216 are formed on the rear plate 215. A plurality of coupling holes 216 are spaced apart by a certain distance along the third direction 16. A plurality of coupling holes 216 are positioned on a center part 350 of the rear plate 215. The cooling fan 250 is positioned on an outer side of the coupling holes 216.

The battery module 230 has a plurality of secondary batteries. The secondary battery provided to the battery module 230 may be pouch-shaped secondary batteries. A plurality of battery modules 230 may be provided within the rack housing 210. A plurality of battery modules 230 may be stacked and positioned on one another along the third direction 16. The cooling fan 250 may be coupled with the battery module 230. The cooling fan 250 may adjust a flow of the fluid such that the cooling fluid supplied to the cooling space 102 may be passed through the battery rack 200. For example, the cooling fan 250 may be coupled with a rear surface of the battery module 230 in the second direction 14, and may absorb the cooling fluid so that the cooling fluid supplied to the cooling space 102 is moved from the front cover 213 to a rear surface in the second direction 14. The cooling fan 250 may be positioned on an outer side of the rear plate 215 when the battery module 230 is inserted into the rack housing 210. A plurality of cooling fans 250 may be stacked and positioned on one another along the third direction 16.

The controller 270 may be positioned within the rack housing 210. The controller 270 may be positioned above the battery modules 230 which are stacked and positioned on one another. The controller 270 may perform operations for charging/discharging and protecting the battery module 230. The controller 270 may control an operation of the cooling fan 250.

Figure 13:
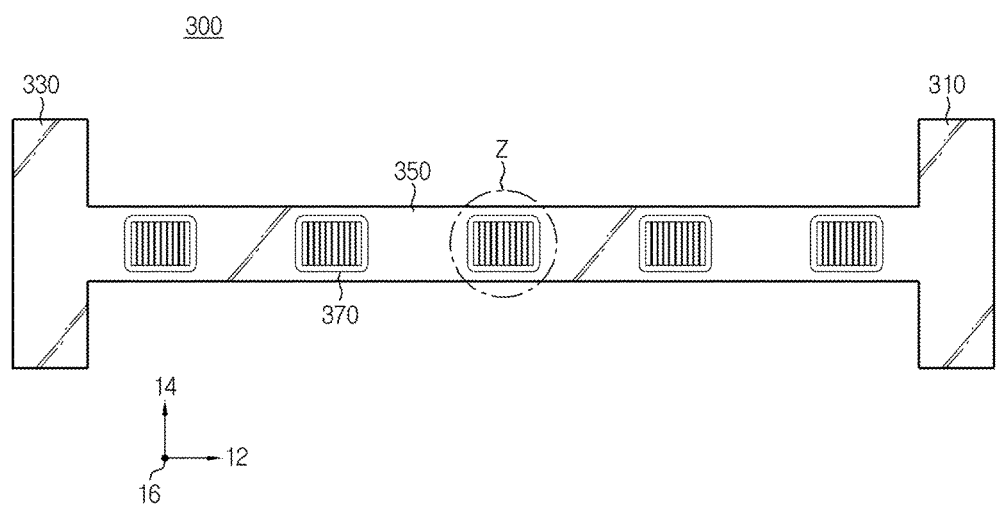
FIG. 13 is a rear view of the upper duct of FIG. 3.
Figure 14:
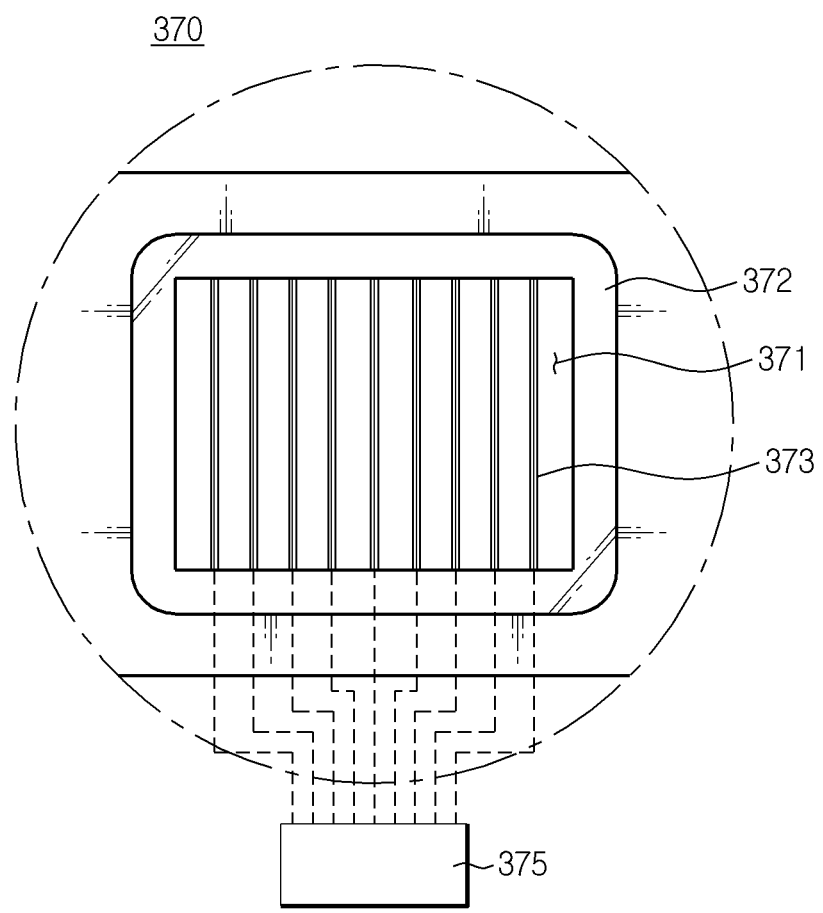
FIG. 14 is an expanded view of a Z region of FIG. 13.

FIG. 13 is a rear view of an upper duct of FIG. 3, and FIG. 14 is an expanded view of a Z region of FIG. 13. Referring to FIGS. 3, 13, and 14, the upper duct 300 supplies the cooling fluid to the receiving space 101. The upper duct 300 may be positioned above the chamber 100. The upper duct 300 may be connected to a plurality of cooling units 400 to be described below. Inside the upper duct 300, there may be formed a space to which the cooling fluid supplied from the cooling unit 400 flows. The upper duct 300 includes a cover 390, a first horizontal part 310, a second horizontal part 330, a center part 350, and a supply 370.

The cover 390 has a space therein. The cover 390 may be provided in an approximately prismatic shape. The cover 390 may be positioned above the chamber 100. The cover 390 may be provided in a similar shape as the chamber 100, and a height of the cover 390 in the third direction 16 may be provided to be lower than the chamber 100. The first horizontal part 310, the second horizontal part 330 and the center part 350 may be positioned in an inner space of the cover 390.

The first horizontal part 310, the second horizontal part 330 and the center part 350 may be connected to each other, and the cooling fluid may flow each of the inner spaces. The first horizontal part 310, the second horizontal part 330, and the center part 350 may be combined with each other into a shape of a Roman character T when seen from above. The first horizontal part 310 may be positioned adjacently to the first sidewall 110. A length direction of the first horizontal part 310 may be formed along the second direction 14. The second horizontal part 330 may be positioned adjacently to the third sidewall 130. The second horizontal part 330 may be positioned in parallel with the first horizontal part 310. A length direction of the second horizontal part 330 may be formed along the second direction 14.

The center part 350 may be coupled perpendicularly to centers of the first horizontal part 310 and the second horizontal part 330, respectively. A length direction of the center part 350 may be formed along the first direction 12.

The supply 370 may be positioned on a lower surface of the upper duct 300. The supply 370 may be positioned on the center part 350. The cooling fluid flowing the center part 350 may pass through the supply 370. The supply 370 may supply the cooling fluid to the receiving space 101. A plurality of supplies 370 may be provided. A plurality of supplies 370 may be positioned on the lower surface of the center part 350. A plurality of supplies 370 may be spaced apart from each other by a certain distance along the first direction 12.

The supply 370 includes a frame 372, an opening 371, a guide plate 373, and a controller 375.

The frame 372 may form an empty space at a center. The frame 372 may be provided in a rectangular frame shape.

The cooling fluid flowing the upper duct 300 may pass through the opening 371. The frame 372 may be provided on the opening 371. The opening 371 may be provided in a rectangular shape.

The guide plate 373 may be disposed at a central region of the opening 371. The guide plate 373 may be provided as a plate having a thin thickness. A plurality of guide plates 373 may be provided. A plurality of guide plates 373 may be disposed in parallel, while being spaced apart from each other along the first direction 12. The guide plate 373 may be rotatably provided.

The controller 375 may control a rotation angle of the guide plate 373. The controller 375 may adjust the rotation angle of the guide plate 373 so that the cooling fluid passing through the supply 370 is supplied along the first direction 12 of the cooling space 102.

The cooling fluid supplied to the cooling space 102 may not be directly supplied to the battery rack 200 through the supply 370. Accordingly, since the cooling fluid is not directly supplied to the battery rack 200, generation of the swirling caused by the fluid colliding against the battery rack 200 can be suppressed. Further, according to the configuration described above, after the cooling fluid is supplied from an upper portion to a lower portion of a space between the first battery rack group 201 and the second battery rack group 202, the cooling fluid may be passed through the battery rack 200 by the cooling fan 250 to cool the battery rack 200. Accordingly, cooling of the battery rack 200 can be stably performed. Further, since the cooling fluid is prevented from being supplied from the supply 370 directly to the battery rack 200, concentration of the cooling fluid only above the battery rack 200 is prevented.

The cooling unit 400 may be positioned outside the receiving space 101. The cooling unit 400 may cool the heated cooling fluid. The cooling unit 400 may provide the cooled cooling fluid to the upper duct 300. The cooling unit 400 may cool the cooling fluid supplied from the moving space 501 which will be described below.

A plurality of cooling units 400 may be provided. According to an exemplary embodiment, 4 cooling units 400 may be provided. Two of the cooling units 400 may be installed on the first sidewall 110. The two cooling units 400 may be spaced apart from each other by a certain distance along the second direction 14. The two cooling units 400 may be connected to the first horizontal part 310, and supply the cooling fluid to the first horizontal part 310.

The other two of the cooling units 400 may be installed on the third sidewall 130. The two cooling units 400 may be spaced apart from each other by a certain distance along the second direction 14. The two cooling units 400 may be connected to the second horizontal part 330, and supply the cooling fluid to the second horizontal part 330.

The cooling unit 400 may include a suction part. The suction part may suction the cooling fluid of the moving space 501. According to an exemplary embodiment, the cooling unit 400 may be provided as an air conditioner equipped with the suction part. Alternatively, the cooling unit 400 may be provided as a device that can cool the cooling fluid.

According to an exemplary embodiment, the cooling unit 400 may be positioned outside the chamber 100, and accordingly, it is possible to secure more space for receiving the battery rack 200 therein. When the cooling unit 400 is positioned outside, more battery racks 200 may be placed in the chamber 100. As a result, energy density of the energy storage apparatus 10 may be enhanced.

Figure 5:
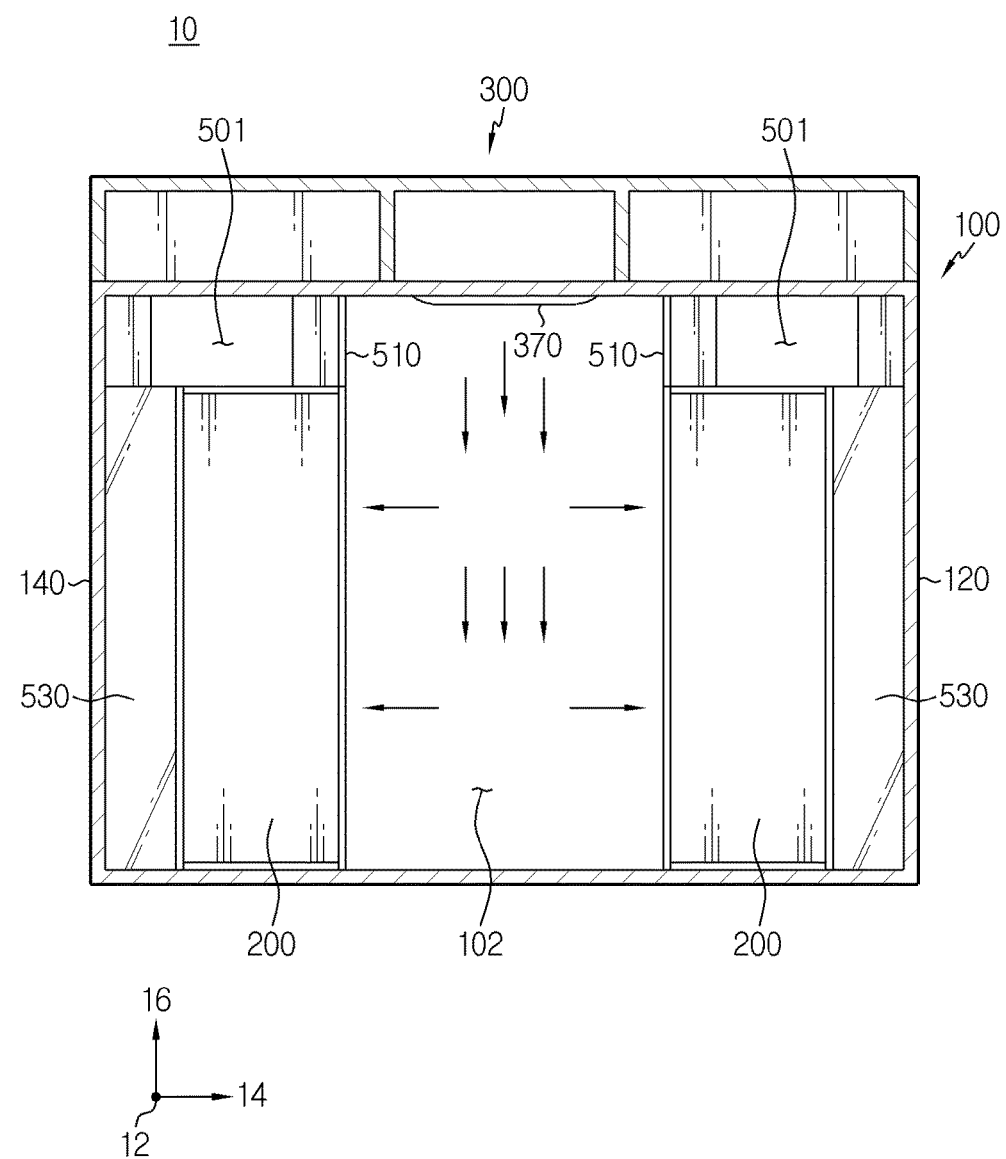
FIG. 5 is a view of the energy storage apparatus of FIG. 4 seen from A-A direction.
Figure 6:
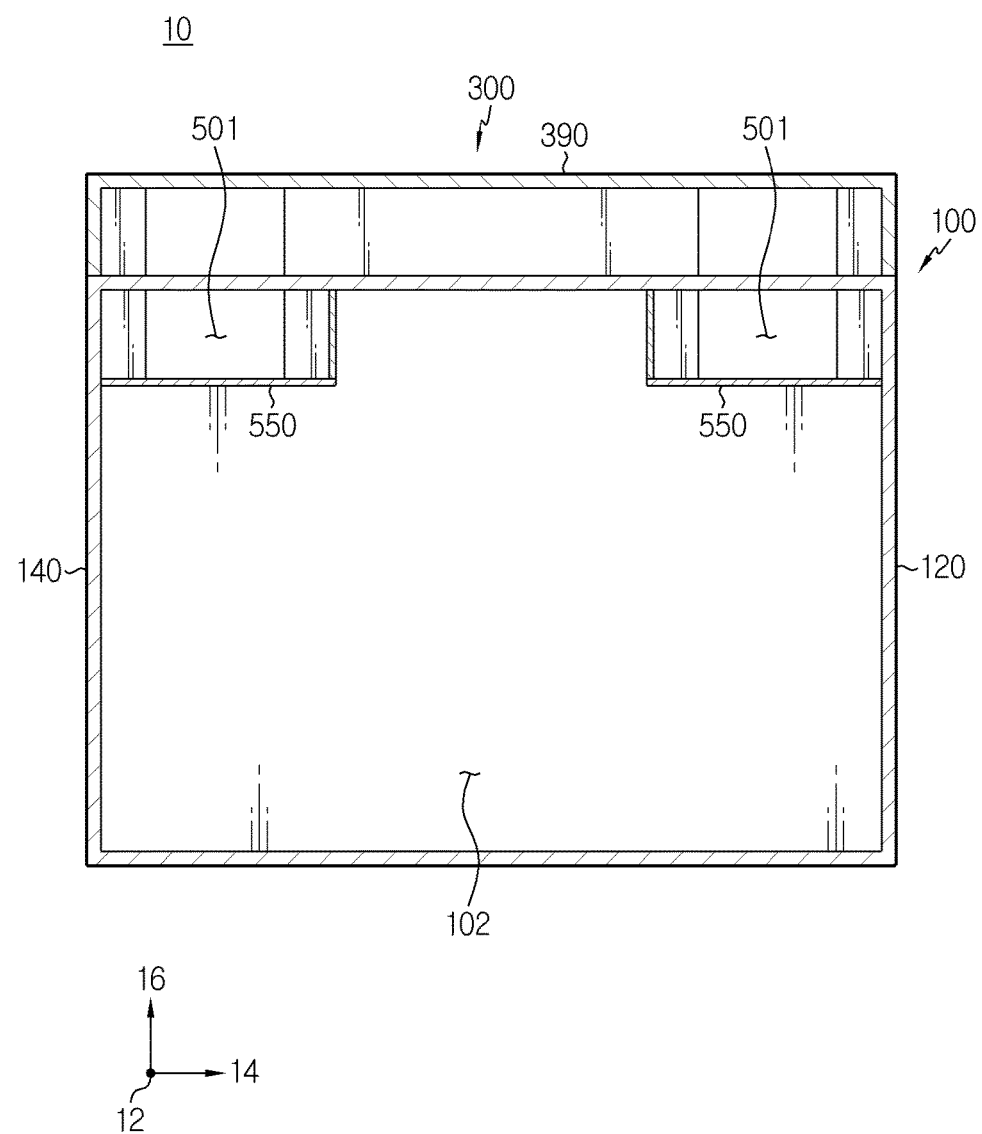
FIG. 6 is a view of the energy storage apparatus of FIG. 4 seen from B-B direction.
Figure 7:
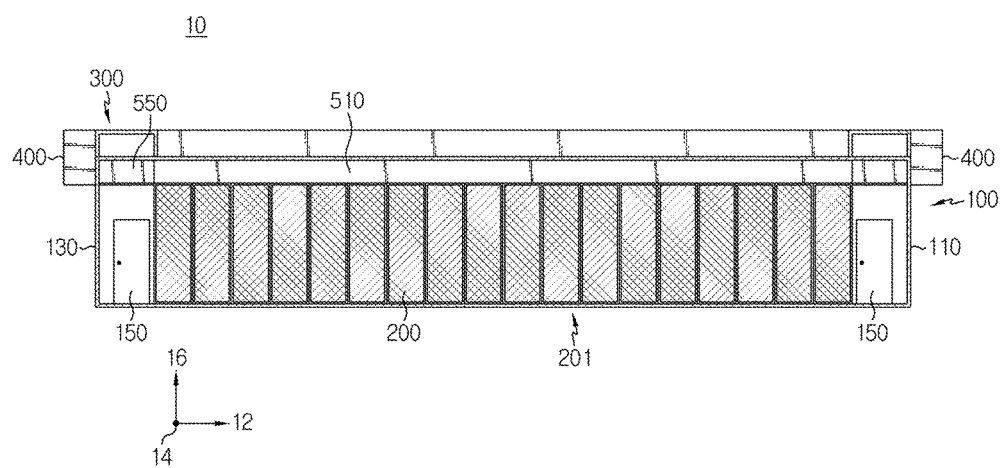
FIG. 7 is a view of the energy storage apparatus of FIG. 4 seen from C-C direction.

FIG. 5 is a view of the energy storage apparatus of FIG. 4 seen from A-A direction, FIG. 6 is a view of the energy storage apparatus of FIG. 4 seen from B-B direction, and FIG. 7 is a view of the energy storage apparatus of FIG. 4 seen from C-C direction. Hereinbelow, referring to FIGS. 4 to 7, the fluid moving member 500 may move the cooling fluid by providing the moving space 501 where the cooling fluid for cooling the battery rack 200 is moved. According to an exemplary embodiment, it is exemplified that two fluid moving members 500 are provided within the chamber 100. The two fluid moving members 500 have identical configuration except for different positions from each other. Hereinbelow, the fluid moving member 500 positioned near to the first battery rack group 201 will be described as an example. The fluid moving member 500 includes a partition 510, a blocking plate 530, and an inner duct 550.

The partition 510 may be positioned above the first battery rack group 201. The partition 510 may be positioned between an upper wall of the chamber 100 and the first battery rack group 201. The partition 510 may prevent the cooling fluid supplied from the upper duct 300 from moving to the space between the first battery rack group 201 and the second sidewall 120. A length direction of the partition 510 may be formed along the first direction 12. The partition 510 may be provided in a panel-shaped plate.

The blocking plate 530 may block the space between the second sidewall 120 and the first battery rack group 201. The blocking plate 530 may be positioned between the battery rack 200 positioned on an outermost side of the first battery rack group 201 and the second sidewall 120. A pair of blocking plates 530 may be provided. The blocking plate 530 may be positioned opposite each other. A pair of blocking plates 530 may be spaced apart along the first direction 12. The blocking plate 530 may be provided at a same height as the battery rack 200.

The cooling fluid may flow inside the inner duct 550. A pair of inner duct 550 may be provided. A pair of inner ducts 550 may be spaced apart from each other along the first direction 12. The inner duct 550 may connect the moving space 501 between the second sidewall 120 and the first battery rack group 201. The inner duct 550 may be positioned to be higher than the upper surface of the door 150. The inner duct 550 may be positioned above the blocking plate 530. The inner duct 550, which is in a rectangular shape in cross-section, may be provided. One end of the inner duct 550 may be connected to the cooling unit 400, and the other end may be connected to the space between the second sidewall 120 and the first battery rack group 201. The inner duct 550 may provide the space where the cooling fluid past through the battery rack 200 is moves toward the cooling unit 400.

As described above, the fluid moving member 500 with the partition 510, the blocking plate 530 and the inner duct 550 may provide the moving space 501 separated from the cooling space 102. The moving space 501 is a space where the cooling fluid supplied to the cooling space 102 is passed through the battery rack 200, cools the battery rack 200, and then moved to the cooling unit 400. When the cooling fluid cools the battery rack 200, the fluid may cool the battery rack 200 by passing between the battery modules 230 stacked on one another or passing through each of the battery modules 230. The moving space 501 may be formed to a shape of an alphabet 'T' when seen from a center of the cooling space 102 to a direction of the second sidewall 120. The moving space 501 may be isolated from the cooling space 102 so that the cooling fluid past through the battery rack 200 and heated can be moved without being mixed with the cooling fluid of the cooling space 102. Accordingly, efficiency of cooling the battery rack 200 can be enhanced.

The energy storage apparatus 10 may include an extinguishing member (not illustrated). The extinguishing member may be provided on a sidewall or an upper wall inside the chamber 100. The extinguishing member may be provided to extinguish a fire if fire occurs within the chamber 100.

Hereinbelow, flow of the cooling fluid in the energy storage apparatus 10 of FIG. 3 will be described. Arrows of FIGS. 4 and 5 schematically represent a direction the cooling fluid flows. Hereinbelow, referring to the drawings of FIGS. 4 and 5, the initial cooling fluid may move from the cooling unit 400 to the upper duct 300. The cooling fluid may move to the upper duct 300 through the cooling unit 400 positioned on the first sidewall 110 or the third sidewall 130. The cooling fluid may move to the center part 350 from the first horizontal part 310 or from the second horizontal part 330. In the process of moving to the center part 350, the cooling fluid may move to the cooling space 102 through the supply 370 formed below the center part 350. The cooling fluid moved to the cooling space 102 may be passed through the battery module 230 by the cooling fan 250 of the battery rack 200. The cooling fluid may cool the battery module 230 while passing through the battery module 230. For example, the cooling fluid may cool the battery rack 200 by passing between each of the battery modules 230 stacked on one another, or by passing through each of the battery modules 230. The cooling fluid past through the battery module 230 may be moved to the cooling unit 400 through the moving space 501 isolated from the cooling space 102. The heated cooling fluid moved to the cooling unit 400 may be cooled again and supplied to the upper duct 300.

As described above, the energy storage apparatus 10 of the present disclosure may cool the battery rack 200 by circulating the cooling fluid from the cooling unit 400, the upper duct 300, the cooling space 102, the battery module 230, the moving space 501, and back to the cooling unit 400. During the above process, the cooling space 102 may be isolated from the moving space 501 where the heated cooling fluid moves, which may enhance cooling efficiency of the battery rack 200.

Further, the cooling unit 400 may be positioned outside the energy storage apparatus 10, which may secure more space for receiving the battery rack 200 therein. Accordingly, more battery racks 200 are mounted per chamber 100, and energy density of the energy storage apparatus 10 can be enhanced.

According to an exemplary embodiment, energy density can be enhanced by increasing an area occupied by the battery rack 200 to two-third (⅔) of the cross-sectional area of the chamber 100 or more. The areas occupied by the chamber 100 and the battery rack 200 respectively represent the areas occupied by the chamber 100 and the battery racks 200 with reference to a plane cross-sectioned view of the energy storage apparatus, as illustrated in FIG. 4.

Figure 15:
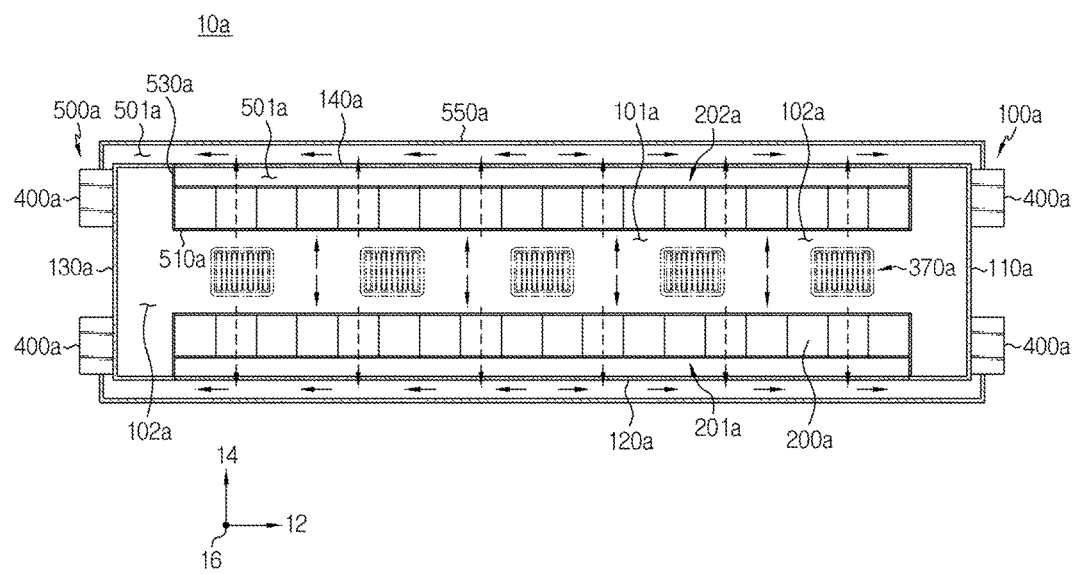
FIG. 15 is a plane cross-sectioned view illustrating the energy storage apparatus of FIG. 3 according to another exemplary embodiment.

FIG. 15 is a plane cross-sectioned view illustrating the energy storage apparatus of FIG. 3 according to another exemplary embodiment. Referring to FIG. 15, the energy storage apparatus 10a includes the chamber 100a, the battery rack 200a, the upper duct 300a, the cooling unit 400a, and the fluid moving member 500a. The chamber 100a, the battery rack 200a, the upper duct 300a, and the cooling unit 400a of FIG. 15 are almost identical to the chamber 100, the battery rack 200, the upper duct 300, and the cooling unit 400 of the energy storage apparatus 10 of FIG. 3.

The fluid moving member 500a includes the partition 510a, the blocking plate 530a, and an outer duct 550a.

The provided blocking plate 530a may be almost identical to the blocking plate 530 of FIG. 3. The partition 510a may be almost identical to the partition 510 of FIG. 3. However, the partition 510a of FIG. 15 may be provided up to an upper portion of the blocking plate 530a. The partition 510a may be positioned above a pair of blocking plates 530a and above the first battery rack group 201a. The cooling space 102a and the moving space 501a may be isolated from each other by the partition 510a and the blocking plate 530a.

The outer duct 550a may be positioned outside the second sidewall 120a or the fourth sidewall 140a. The moving space 501a may be provided within the outer duct 550a. One end of the outer duct 550a may be connected to the cooling unit 400a positioned on the first sidewall 110a, and the other end may be connected to the cooling unit 400a positioned on the third sidewall 130a.

A plurality of outlets (not illustrated) may be formed on the second sidewall 120a or the fourth sidewall 140a for moving of the cooling fluid. The cooling fluid may pass through the outlets. For example, after cooling the battery rack 200a, the cooling fluid may be moved to the moving space 501a between the second sidewall 120a and the first battery rack group 201a. The cooling fluid may then be moved to the moving space 501a of the outer duct 550a through the outlets positioned on the second sidewall 120a. The cooling fluid may be moved to the cooling unit 400a from the moving space 501a of the outer duct 550a to the cooling unit 400a.

A fluid guide member (not illustrated) may be further provided in the moving space 501a of the outer duct 550a. The fluid guide member may be provided to guide moving of the cooling fluid to the cooling unit 400a. For example, the fluid guide member may be provided as a ventilator. Alternatively, the fluid guide member may be provided as a device that can move the cooling fluid to the cooling unit 400a.

The arrows of FIG. 15 schematically represent a moving directions of the cooling fluid. In the energy storage device 10a of FIG. 15, the cooling fluid may move from the initial cooling unit 400a to the upper duct 300a. The cooling fluid may then move from the upper duct 300a to the cooling space 102a through the center part 350a. The cooling fluid may cool the battery rack 200a by passing through the battery module 230a in the cooling space 102a. The cooling fluid past through the battery rack 200a may be moved to the outer duct 550a, and moved to the cooling unit 400a through the moving space 501a. The cooling unit 400a may cool the heated cooling fluid and provide the cooled fluid to the upper duct 300a.

With respect to the energy storage device 10a of FIG. 15, the cooling space 102a and the moving space 501a may be completely isolated from each other by using the outer duct 550a, and the cooling fluid of the cooling space 102a and the heated cooling fluid may be moved without being mixed with each other. Accordingly, cooling efficiency of the energy storage apparatus may be enhanced.

The above specification exemplifies the present disclosure. Further, the above description illustrates and explains preferred embodiments of the present disclosure, and the present disclosure may be used in various other combination, modifications, and environments. In other words, modification or revision may be possibly performed within a scope of the present disclosure and equivalent scope of the described present disclosure and/or within technology or knowledge in a related art. The embodiments of the present disclosure explain a best modification to implement a technical art of the present disclosure, and there are possibly provided various other modifications as required in specific applied fields and use of the present disclosure. Accordingly, the specification of the present disclosure does not limit the invention with the provided embodiments. Further, a scope of appended claims should be construed as including another preferred embodiment.

DESCRIPTION OF REFERENCE NUMERALS

| | |
|---|---|
| 10: energy storage apparatus | 100: chamber |
| 110: first sidewall | 120: second sidewall |
| 130: third sidewall | 140: fourth sidewall |
| 150: door | 200: battery rack |
| 201: first battery rack group | 202: second battery rack group |
| 210: rack housing | 230: battery module |
| 250: cooling fan | 300: upper duct |
| 400: cooling unit | 500: fluid moving member |
| 510: partition | 530: blocking plate |
| 550: inner duct | |

What is claimed is:

1. An energy storage apparatus, comprising:
a chamber comprising a first sidewall, a second sidewall positioned perpendicularly to the first sidewall, a third sidewall facing the first sidewall and positioned perpendicularly to the second sidewall, a fourth sidewall facing the second sidewall and positioned perpendicularly to the first sidewall and the third sidewall, and a receiving space therein;
battery racks comprising a first battery rack group and a second battery rack group positioned in the receiving space and spaced apart from each other while facing each other with reference to a center of the receiving space, the battery racks of the first battery rack group being spaced apart from the second sidewall by a certain distance and disposed in parallel along a first direction, the battery racks of the second battery rack group being spaced apart from the fourth sidewall by a certain distance and disposed in parallel along the first direction, each battery rack including a plurality of batteries staked in a third direction perpendicular to the first direction;
an upper duct positioned above the receiving space configured to supply cooling fluid to a cooling space which is a space between the first battery rack group and the second battery rack group;
a cooling unit positioned outside the receiving space and configured to cool the cooling fluid; and
a fluid moving member comprising a moving space where the cooling fluid heated after passing through the battery racks from the cooling space moves to the cooling unit,
wherein the cooling unit is configured to be supplied with the heated cooling fluid from the moving space, cool the supplied cooling fluid, and then supply a resultant fluid to the upper duct and the cooling space, the battery racks, and the moving space have locations relative to one another that are configured to move the cooling fluid through the battery racks in a second direction perpendicular to each of the first and third directions.

2. The energy storage apparatus of claim 1,
wherein a plurality of cooling units are provided on an outer side of the first sidewall and the third sidewall.

3. The energy storage apparatus of claim 2, wherein each battery rack group comprises:
a rack housing comprising a space therein;
a plurality of battery modules positioned in the inner space of the rack housing; and
a cooling fan coupled with the battery module.

4. The energy storage apparatus of claim 3, wherein each rack housing comprises:
a front cover comprising a plurality of holes; and
a rear plate having a coupling hole to be inserted with a portion of the battery module.

5. The energy storage apparatus of claim 4, wherein a plurality of battery modules are stacked on one another and positioned within each rack housing, and
the cooling fan is positioned on an outer side of the rear plate.

6. The energy storage apparatus of claim 5, wherein the cooling fans of each group are positioned adjacently to the second sidewall or the fourth sidewall.

7. The energy storage apparatus of claim 5, wherein the fluid moving member comprises:
a partition positioned above the first battery rack group and the second battery rack group;
a pair of blocking plates configured to block a space between the battery rack positioned on an outermost side of the first battery rack group or the second battery rack group and the second sidewall or the fourth sidewall; and
a pair of inner ducts configured to connect a moving space between the cooling unit and the second sidewall or a moving space between the second sidewall and the first battery rack group or the second battery rack group.

8. The energy storage apparatus of claim 7, wherein the chamber is provided with a door formed on the second sidewall or the fourth sidewall and positioned adjacently to the first sidewall or the third sidewall, and
the inner duct is positioned to be higher than an upper surface of the door.

9. The energy storage apparatus of claim 5, wherein the upper duct comprises:
a first horizontal part positioned adjacently to the first sidewall;
a second horizontal part positioned adjacently to the third sidewall and in parallel to the first horizontal part; and a center part coupled perpendicularly to centers of the first horizontal part and the second horizontal part, respectively.

10. The energy storage apparatus of claim 9, wherein the first horizontal part, the second horizontal part, and the center part are combined with each other to be formed into an I-shape when seen from above.

11. The energy storage apparatus of claim 9, wherein the upper duct comprises a supply which is configured to supply the cooling fluid to the receiving space and positioned on the center part, wherein the supply comprises:
an opening where the cooling fluid flowing inside the upper duct is passed through;
a plurality of guide plates disposed on a center region of the opening in parallel while being spaced apart from each other along the first direction, the guide plate being rotatably provided; and
a controller configured to control the guide plate.

12. The energy storage apparatus of claim 11, wherein a plurality of supplies are positioned on a lower surface of the center part, and the plurality of supplies are spaced apart by a certain distance along the first direction.

13. The energy storage apparatus of claim 11, wherein the controller controls the guide plate so as to adjust a supply direction of the cooling fluid supplied to the cooling space through the opening.

14. The energy storage apparatus of claim 5, wherein the fluid moving member comprises:
a partition positioned above the first battery rack group or above the second battery rack group; and
an outer duct positioned outside the second sidewall or the fourth sidewall, having therein the moving space where the cooling fluid flows, and configured to supply the cooling fluid to the cooling unit.

15. The energy storage apparatus of claim 14, wherein the second sidewall and the fourth sidewall are provided with a plurality of outlets where the cooling fluid is discharged to the moving space.

16. A method for cooling the energy storage apparatus of claim 1, the method comprising:
cooling the battery racks,
wherein the battery racks are cooled when the cooling fluid is supplied to the cooling space between the first battery rack group and the second battery rack group from above the receiving space and passed through the first battery rack group or the second battery rack group, respectively,
the cooling fluid passed through the battery racks is moved through the moving space and cooled by the cooling unit, and
the cooling fluid is supplied to above the receiving space, and then supplied into the cooling space to cool the battery racks.

17. The method of claim 16, wherein the cooling space and the moving space are respectively positioned within the receiving space.

18. The method of claim 17, wherein the cooling space is positioned at a center of the receiving space, and the moving space is positioned on both edge regions of the cooling space.

19. The method of claim 16, wherein the cooling space is positioned within the receiving space, and the moving space is positioned outside the receiving space.

20. The method of claim 16, wherein each battery rack comprises a cooling fan configured to move the cooling fluid from the cooling space to the moving space.

\* \* \* \* \*